Figures 1, 2, 3, 4:
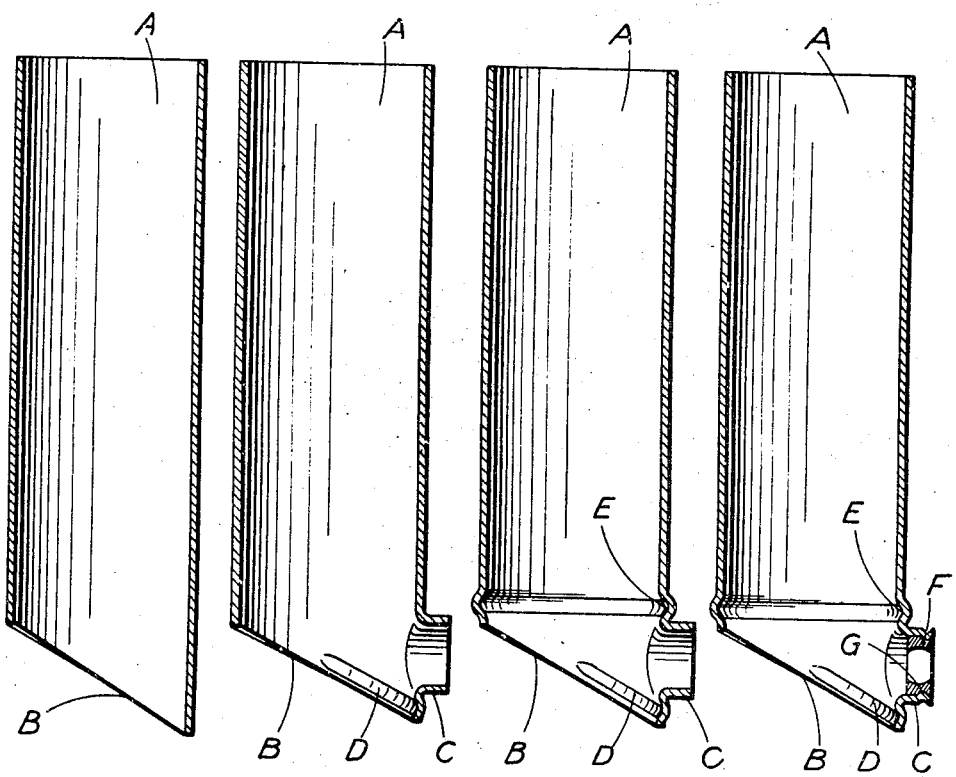

July 17, 1928.

H. R. RICARDO

METHOD OF MAKING SLEEVE VALVES

Filed Nov. 6, 1926

1,677,249

INVENTOR
Harry R. Ricardo
BY Watson, Coit, Morse & Grindle
ATTYS.

Patented July 17, 1928.

1,677,249

UNITED STATES PATENT OFFICE.

HARRY RALPH RICARDO, OF LONDON, ENGLAND.

METHOD OF MAKING SLEEVE VALVES.

Application filed November 6, 1926, Serial No. 146,705, and in Great Britain December 18, 1925.

This invention relates to sleeve valves for fluid pressure engines, pumps or compressors and is particularly applicable to those in which the sleeve has a combined oscillating and reciprocating motion imparted thereto.

Such sleeves are usually of plain tubular form except for a boss or bosses which receive members serving to impart the desired motion to the sleeve, and, in most cases, stiffening ribs formed adjacent to the boss or bosses. In previous constructions these bosses and stiffening ribs have been formed either by casting the sleeve and bosses in one, which involves the use of relatively weak metals, by rough forging and machining or by screwing on to the end of the sleeve a collar carrying the boss or bosses. Each of the above constructions is undesirably heavy since the complex shape near the boss renders it impossible to remove all the superfluous metal in this region while even a partial removal of this metal involves expensive machining operations.

The object of the present invention is to provide a sleeve which will be light in weight while having the requisite strength and will be relatively inexpensive to produce as compared with the constructions hitherto employed.

To this end, according to this invention, a sleeve valve is formed integral by pressing, rolling, punching or like operations from a tubular metal blank, this blank being formed preferably by drawing or pressing. In this way one or more bosses for the driving connection or connections with or without stiffening ribs or corrugations adjacent thereto may be formed on and integral with the tubular metal blank. For example, where a combined oscillating and reciprocating motion is to be imparted to the sleeve in known manner by a single rotating member, a single boss is conveniently pressed out of the tube and has secured within it a member constituting or connected to one part of a spherical joint or other flexible connection through which the desired motion is to be imparted to the sleeve. The part of the flexible connection disposed within the boss is conveniently secured thereto by pressing or rolling a portion of the boss into a circumferential groove on the outer surface of the member disposed within it. Alternatively the boss itself may be rolled or pressed into a spherical form and may then constitute the outer member of a spherical joint, the inner member of this joint either constituting the die round which the boss is pressed or rolled or being subsequently inserted.

In some cases the metal blanks may be expanded into moulds by internal hydraulic pressure.

When the metal of which the sleeve is formed is suitable the ports for controlling the working fluid or for other purposes may be formed in the sleeve by punching, the part of the sleeve adjacent to the ports being held between two cylindrical or partly cylindrical dies during this operation so as to prevent deformation of the sleeve. In this way a considerable economy is effected since the ports are often of a somewhat complex form which would otherwise necessitate expensive machining operations.

It will be seen that with a sleeve formed according to this invention the thickness of the metal is everywhere kept to a minimum. Further the drawn or pressed tubes from which the sleeves are formed can be made to a higher degree of accuracy than can castings or forgings, so that less machining is necessary to the bore and cylindrical outer surface of the sleeve, while the metal being highly worked has good mechanical properties thus enabling thinner sections to be employed than hitherto.

The invention is particularly applicable to sleeve valves for internal combustion engines of the kind in which each cylinder is formed of aluminium, magnesium or an alloy thereof having a relatively high coefficient of expansion, while the sleeve valve is formed of a ferrous metal whose coefficient of expansion over the working range of temperature exceeds $16 \times 10^{-6}$ per degree centigrade, the piston working within the sleeve being formed either of a ferrous metal or wholly or mainly of a non-ferrous metal having a coefficient of expansion which approximates to that of the non-ferrous metal of which the cylinder is formed. Thus, an example of a ferrous metal suitable for the construction of a sleeve according to the present invention is one containing 8% of nickel and 18% of chromium.

The invention may be carried out in various ways but one form of sleeve and the various stages in the method of constructing the same according to the present invention is shown somewhat diagrammatically in the accompanying drawings. Figures 1 to 4 are sectional views through the sleeve showing successive steps in the method of forming the driving boss.

Figure 5:
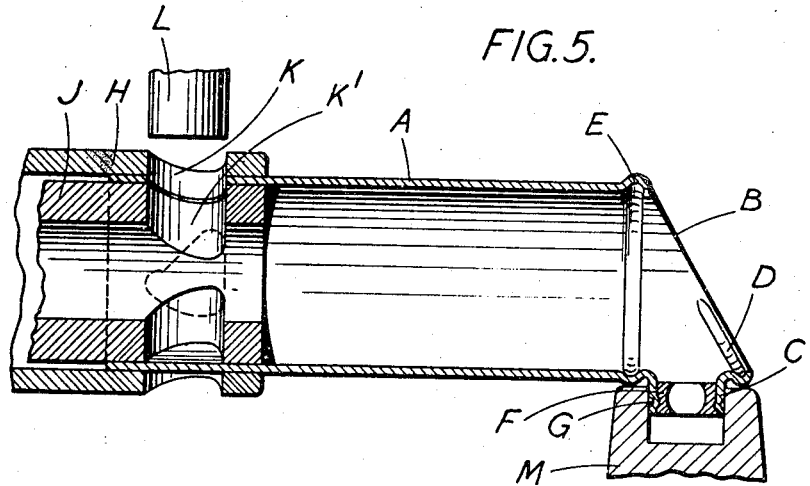

Figure 5 is a sectional view showing the method of punching out the ports.

The sleeve is constructed from a blank comprising a plain cylindrical metal tube A preferably formed by pressing or drawing. The lower end of this tube is cut obliquely so that one side of the tube projects below the other as shown at B in Figure 1. The first operation consists in pressing out laterally a part of this projecting part of the tube so as to form a hollow cylindrical boss C as shown in Figure 2 with or without one or more stiffening ribs or corrugations adjacent thereto. For example a stiffening rib D such as that shown in Figure 2 may be formed below the boss and substantially parallel to the oblique lower edge B of the sleeve in the same operation which forms the boss C. The second operation is to form, for example by rolling, a stiffening rib or corrugation E circumferentially around the sleeve about the boss, this rib being so disposed that it passes just above the lower edge of the shorter side of the sleeve and thus extends completely around the sleeve as shown in Figure 3.

The next operation is to secure within the boss a member F forming or connected to one part of a spherical joint or other flexible connection through which the desired motion is to be imparted to the sleeve. This member F, which may be for example the outer member of a spherical joint, is conveniently secured within the boss by pressing or rolling a portion G of the boss into an external groove on this member as shown in Figure 4.

Alternatively to the arrangement shown in Figure 4 the boss C may itself be formed spherical and constitute the outer member of a spherical joint. Further, one end of a pin may be secured within the boss C, the other end being adapted to engage a spherical joint or the like in a rotating member in known manner.

Where the metal of which the sleeve is formed is suitable the ports for controlling the flow of working fluid into or out from the cylinder may be punched out of the sleeve by punches of the required shape. In this case the portion of the sleeve adjacent to these ports is held conveniently during this operation between two cylindrical dies H and J having in them suitably shaped holes K, K¹ through which the punches L can pass as shown in Figure 5. Thus, deformation of the sleeve is prevented. Further a suitable socket M is conveniently provided into which the boss C is adapted to fit during the punching operation so as to ensure that the ports are punched in the correct positions relatively to the boss.

When the metal of which the sleeve is formed is unsuitable for punching the ports may be formed in known manner, for example, by milling. The interior and exterior of the sleeve are finally ground or machined to the required dimensions.

It will be understood that any of the operations described above may be completed in two or more stages when the changes in shape are too great to be carried out conveniently in one operation, while between the stages the metal may be softened by annealing.

If additional strength is required at the lower end of the sleeve the tubular "blank" may be thickened locally by "upsetting" or other known process prior to pressing.

It will be seen that a sleeve constructed as above described and prior to machining it internally and externally comprises a tubular body portion with a boss formed integral therewith and a member secured within the boss by means of which the desired motion can be imparted to the sleeve, the whole being formed without any machining operation. Further, owing to the degree of accuracy with which it is possible to perform drawing, rolling and pressing operations, the amount of machining which will be required to bring the internal and external surfaces of the sleeve to the desired dimensions will be relatively small.

It is to be understood that the pressing or rolling operations which are carried out on the cylindrical blank may be varied according to the type of operating mechanism and the engine with which the sleeve is to be employed.

What I claim as my invention and desire to secure by Letters Patent is:—

1. The method of forming sleeve valves for fluid pressure engines consisting in pressing out from the wall of a tubular metal blank a boss for a driving connection, and forming a port in the wall.

2. The method of forming sleeve valves for fluid pressure engines consisting in pressing out from the wall of a tubular metal blank a boss for a driving connection forming a port in the wall and machining the main parts of the interior and exterior cylindrical surfaces of the blank.

3. The method of forming sleeve valves for fluid pressure engines consisting in pressing out from the wall of a tubular metal blank a boss for a driving connection, and punching inlet and exhaust ports in the blank.

4. The method of forming sleeve valves for fluid pressure engines consisting in pressing out from the wall of a tubular metal blank a boss for a driving connection, punching inlet and exhaust ports in the blank and machining the main parts of the interior and exterior cylindrical surfaces of the blank.

5. The method of forming sleeve valves for fluid pressure engines consisting in punching inlet and exhaust ports in a tubular metal blank and machining the main parts of the interior and exterior cylindrical surfaces of the blank.

6. The method of forming sleeve valves for fluid pressure engines consisting in pressing out from the wall of a tubular metal blank a boss for a driving connection and pressing a stiffening rib in the blank adjacent to the boss.

7. The method of forming sleeve valves for fluid pressure engines consisting in pressing out from the wall of a tubular metal blank a boss for a driving connection, pressing a stiffening rib in the blank adjacent to the boss and machining the main part of the interior and exterior cylindrical surfaces of the blank.

8. The method of forming sleeve valves for fluid pressure engines consisting in pressing out from the wall of a tubular metal blank a boss for a driving connection, pressing a stiffening rib in the blank adjacent to the boss, forming inlet and exhaust ports in the blank and machining the main parts of the interior and exterior surfaces of the blank.

9. The method of forming sleeve valves for fluid pressure engines consisting in pressing out from the wall of a tubular metal blank a boss for driving connection, placing within the boss the outer annular member of a driving joint having a circumferential groove in its outer surface, and fixing the annular member in position by pressing in the wall of the boss an inwardly extending rib to engage with the circumferential groove in the annular member.

10. The method of forming sleeve valves for fluid pressure engines consisting in pressing out from the wall of a tubular metal blank a boss for a driving connection, placing within the boss the outer annular member of a driving joint having a circumferential groove in its outer surface, fixing the annular member in position by pressing in the wall of the boss an inwardly projecting rib to engage with the groove in the annular member, and forming inlet and exhaust ports in the blank.

11. The method of forming sleeve valves for fluid pressure engines consisting in pressing out from the wall of a tubular metal blank a boss for a driving connection, pressing one or more stiffening ribs adjacent to the boss, placing within the boss the outer annular member of a driving joint having a circumferential groove in its outer surface, and fixing the annular member in position by pressing in the wall of the boss an inwardly projecting rib to engage with the groove in the annular member.

12. The method of forming sleeve valves for fluid pressure engines consisting in pressing out from the wall of a tubular metal blank a boss for a driving connection pressing one or more stiffening ribs adjacent to the boss, placing within the boss the outer annular member of a driving joint having a circumferential groove in its outer surface, fixing the annular member in position by pressing in the wall of the boss an inwardly projecting rib to engage with the groove in the annular member, and punching inlet and exhaust ports in the blank.

13. The method of forming sleeve valves for fluid pressure engines consisting in placing the portion of the tubular blank in which the inlet and exhaust ports are to be formed between two cylindrical dies, and punching out the inlet and exhaust ports through suitable holes in the dies.

14. The method of forming sleeve valves for fluid pressure engines consisting in pressing out from the wall of a tubular metal blank a boss for a driving connection, placing the portion of the blank in which the inlet and exhaust ports are to be formed between two cylindrical dies, punching out the inlet and exhaust ports through suitable holes in the dies, and machining the main parts of the interior and exterior cylindrical surfaces of the blank.

15. The method of forming sleeve valves for fluid pressure engines consisting in pressing out from the wall of a tubular metal blank a boss for a driving connection, pressing a stiffening rib in the blank adjacent to the boss, placing within the boss the outer annular member of a driving joint having a circumferential groove in its outer surface, pressing in the wall of the boss an inwardly projecting rib to engage with the circumferential groove in the annular member, placing the portion of the blank in which the inlet and exhaust ports are to be formed between two cylindrical dies, punching out the inlet and exhaust ports through suitable holes in the cylindrical dies and machining the main interior and exterior circumferential surfaces of the blank.

16. The method of forming sleeve valves for fluid pressure engines consisting in pressing out from the wall of a tubular metal blank having a driving connection boss, one or more stiffening ribs adjacent to boss.

17. The method of forming sleeve valves for fluid pressure engines consisting in forming a boss for a driving connection on the side of a tubular metal blank, placing within the boss the outer annular member of a driving joint having a circumferential groove in its outer surface, and fixing the annular member in position by pressing in the wall of the boss an inwardly projecting rib to engage with the groove in the annular member.

In testimony whereof I have signed my name to this specification.

HARRY RALPH RICARDO.